Patented Feb. 8, 1944

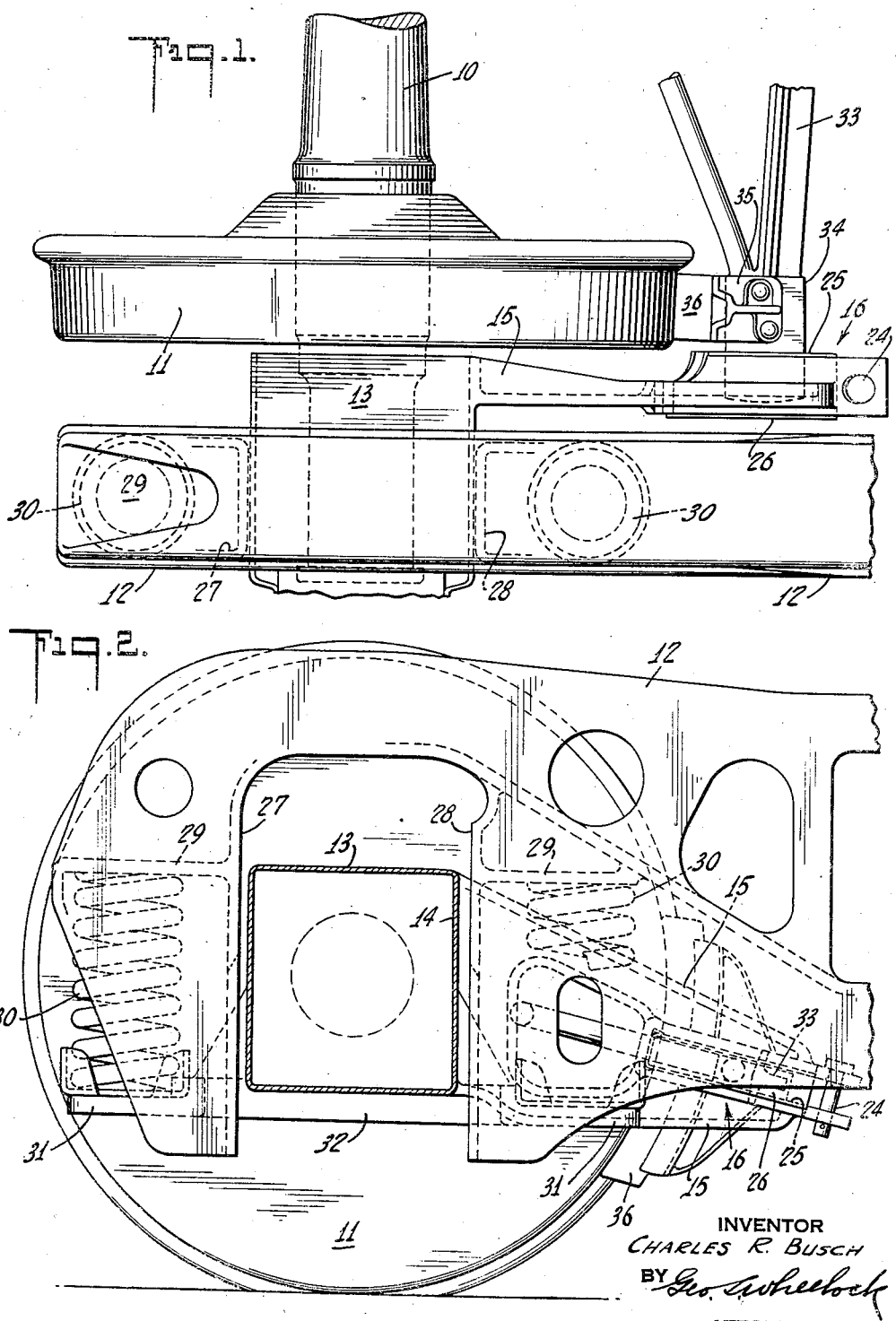

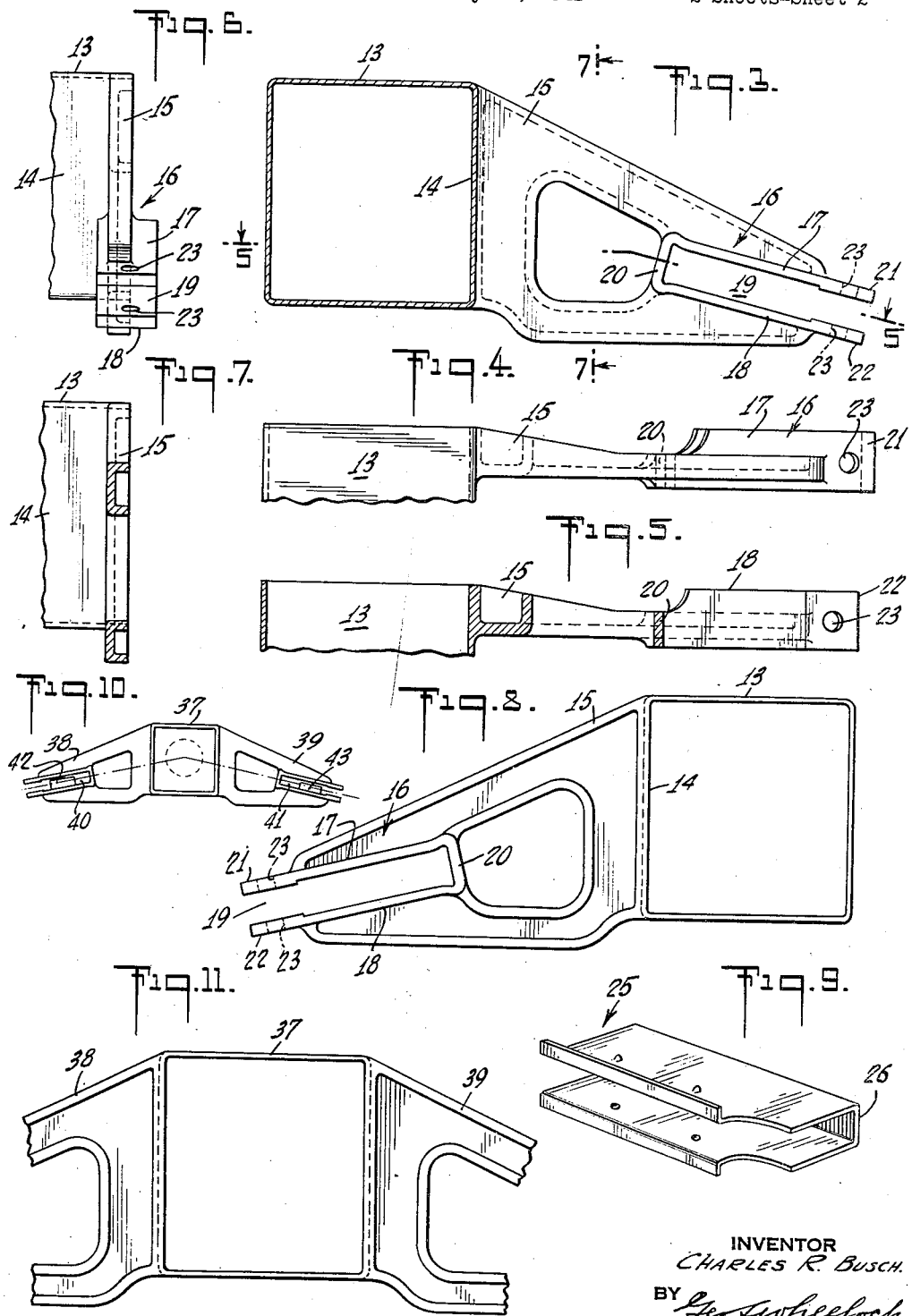

2,340,928

UNITED STATES PATENT OFFICE 2,340,928

BRAKE RIGGING AND/OR RAILWAY CAR TRUCK

Charles R. Busch, Orange, N. J., assignor to Buffalo Brake Beam Company, New York, N. Y., a corporation of New York Application May 15, 1941, Serial No. 393,582

7 Claims. (Cl. 188—212)

This invention relates to brake rigging and/or to railway car trucks, more especially, but not necessarily, adapted for high-speed service, and to a type of truck wherein the spring-suspension for the truck side frames is located at the separate journal boxes themselves, or at the same in combination with the usual spring-suspension of the car body, by means of a bolster guided in the ordinary truck side frames. In such types the truck side frames are mounted on cushioning springs and move vertically within the limits of movement of the springs, which movements range approximately from one and one-half inches to four inches, depending upon the type and construction of the springs used, thus making it unwise to support the brakes or brake rigging from the side frames of such types of trucks.

In my copending applications filed on even date herewith, Ser. No. 393,581, entitled "Case A," and Ser. No. 393,583, now Patent 2,310,195, Feb. 2, 1943, entitled "Case C," there is disclosed brake rigging which is supported from the journal boxes of the car truck, the side frames of the truck being independently supported so that the spring-suspension thereof will permit the same to move up and down without in the least affecting the static position of a brake beam relative to the axis of an adjacent car wheel, the basic principle, which is disclosed and claimed in my prior patents, for guiding the brake beams being substantially maintained except that instead of supporting the brake from the side frames, it is supported from the static journal boxes.

An important difference over the disclosures in the aforesaid applications resides in making the brake frame or member which is supported from the journal box integral with the box, to which end the member and the box may be cast or forged in one piece, or built up as an integral unit, and as in aforesaid applications, the brake frame or bracket-member is adapted for inside or outside brakes or a combination of both, such as a clasp brake, and for two-, four-, six- or eight-wheel trucks. By making the journal box and brake frame or member in one piece with each other, a reduction of the number of parts is obtained, and a simpler rigid and strong construction.

Among such prior patents may be noted the patent to C. R. Busch, 2,170,112, dated August 22, 1939, and other patents to him of the same date, and reference may be had also to applicant's copending application Ser. No. 209,679, filed May 24, 1938.

Another important object of the present invention is to provide brake-beam supporting-members which extend in opposite directions from a journal box, they being formed integral with the box, and each of the members having a brake-beam guide along which the brake-beam may operate in applying or releasing the brake, such guides being inclined downwardly away from their ends which are nearest to the box and extending in planes which intersect within the box, such point of intersection preferably coinciding with the axis of the axle journaled in the box.

These being among the objects of the present invention, the same consists of certain features of construction and combinations of parts to be hereinafter described and then claimed with reference to the accompanying drawings, in which—

Fig. 1 is a plan of a fragmentary portion of a car truck showing one wheel-and-axle assembly, a brake beam and a side frame sufficient to disclose the present improvements which are associated therewith, parts being in broken lines;

Fig. 2 is a side elevation, showing the same parts, the journal box being in section, and the axle and other parts being indicated in broken lines;

Fig. 3 illustrates the unit comprising a journal box and a bracket-member thereon, the said member being shown in side elevation, and the box in vertical section;

Fig. 4 is a top plan of the said unit, a fragment only of the box being illustrated;

Fig. 5 is a section on the line 5—5 of Fig. 3;

Fig. 6 is an end elevation of the unit shown in Fig. 3, as viewed from the right hand;

Fig. 7 is a transverse section on the line 7—7, Fig. 3;

Fig. 8 is a view similar to Fig. 3, except that the unit is shown as viewed toward its opposite side, the box being in elevation;

Fig. 9 is a perspective view of the wear lining for the brake-beam guide;

Fig. 10 is another form showing a brake-beam guiding-bracket at each side of a journal box, so that said box supports two beams; and Fig. 11 is an enlarged fragmentary elevation of what is shown in Fig. 10.

Referring to Figs. 1 and 2, the axle 10 and car wheel 11 constitute a wheel-and-axle assembly, and it will be understood that there are similar assemblies, depending upon the number of wheels used on the car truck. A truck side frame 12 is illustrated, which preferably has a range of up and down movement which is in excess of that allowed where the side frames directly support the brake. One journal box 13 is illustrated and may be of any desirable construction to permit the journal of the axis 10 to be mounted and rotate therein.

One of the vertical walls 14 of the journal box supports a bracket-member 15, which in turn is adapted to afford a support for a brake-beam. As shown, the member 15 is integral with the box 13, the juncture between the wall 14 and the member 15 having a maximum depth which is preferably no greater than the vertical dimensions of the box; that is, the upper and lower edges of said member do not extend over the top and bottom of the box. Preferably, the unit 13, 15 is cast or forged in one piece without joints, but it is conceivable that the member 15 may be made of built-up steel or other plates welded together and welded or riveted to the wall 14 of the journal box, which latter may be of any desirable construction.

That portion of the member 15 which is laterally spaced away from the journal box is provided with a brake-beam guide 16, constructed preferably in accordance with my aforesaid copending applications filed on even date herewith. Hence, the member 15 constitutes a brake-beam supporting- and guiding-member, and in order to guide the beam the member 16 has opposed flat face-portions 17, 18, which define a slot 19, which preferably opens out through both of the opposite vertical surfaces of the number 15. The guide-slot 19 preferably terminates below the lower horizontal plane of the bottom of the box. Preferably, the slot is at an angle of twelve to fourteen degrees to horizontal.

The flat portions or flanges 17, 18 preferably merge with a rib 20, which connects the flanges 17, 18 at the inner end of the slot at each side of member 15. Spaced apart lips or ears 21, 22 form a leader to permit insertion of a beam into the guide and extend beyond the body of member 15, and the flanges 17, 18 preferably merge therewith. The opposed lips 21, 22 are provided with holes 23, which register with each other for the purpose of receiving a stop-pin 24, shown in Figs. 1 and 2. Such stop-pin restricts the outward movement of the brake-beam and prevents the same from falling to the track, but can be moved or removed in order to remove the beam.

A wear-member or lining 25, as shown in Fig. 9, for resisting wear, which might be caused by the movement of the brake beam in the slot 19, is employed for lining the upper and lower walls of the slot. As the slot 19 opens out at the opposite surfaces of the member 15, and as the beam must have very little longitudinal movement in the slots at opposite sides of the truck, the back wall 26 of the wear lining preferably is used to close the back of the slot so as to restrict such possible longitudinal movement of the beam, and to prevent either end of the beam disengaging from a brake-beam guide by a longitudinal movement of the beam. Such lining may be held in place in a manner similar to that disclosed in Patent 2,170,123, dated August 22, 1939.

Because of the very strong construction provided by making a journal box and a brake-beam guiding-member in one piece in the manner described and shown, it will be seen that the brake beam guide 16 with its slot 19 is surely held in fixed alignment with the adjacent axle 10 and that it is assured that the brake beam will always move towards and away from the axle at precisely the same degree of inclination for which the box and member 15 are originally manufactured, and cannot be moved up or down, except for the very slight amount of clearance allowed within the slot itself, when the truck is moving on the track.

The side frame 12 is provided with the usual pedestal legs at each side of the journal box which they span, and, for the spring-suspension of the side frame, the same is provided at each side of the journal box with a spring-seat 29, below each of which is a supporting-spring 30. These springs rest upon spring-seats at the projecting ends 31 of a seat-member or cross-piece 32, which may be welded, riveted, or otherwise permanently attached to the bottom wall of the journal box 13. Hence, each side frame of the truck can move up and down to a more or less increased degree, as employed in high-speed trucks, entirely independently of the brake-beam guides which are immovably mounted on the journal boxes.

As shown in Figs. 1 and 2, the brake beam 33 may have the usual compression and tension members or be otherwise constructed, and, as shown at the end of the partially illustrated beam 33, the terminal 34 thereof may be formed flat for guidance in the adjacent guiding-slot, substantially as in the manner disclosed in one or more of the patents hereinbefore mentioned. Said terminal 34 also supports a brake-head 35, which in turn supports the shoe 36, all in any desirable manner.

A modification of the invention is shown in Figs. 10 and 11, which resides in locating at opposite sides of the journal box 37 two brake-beam supporting- and guiding-members or brackets 38, 39, which extend in opposite directions away from the box. Each of the members 38, 39 is preferably constructed similarly to the member 15 heretofore described. Preferably, the members 38, 39 are formed in one piece with the journal box 37.

The members 38, 39 are respectively provided with slots 40, 41, which, because of this duplex construction, extend in converging planes which intersect within the journal box at a point preferably coinciding with the axis of the adjacent wheel. In Fig. 10 the terminals 42, 43 of the two brake beams which would be supported by the structure are illustrated in full lines. Such terminals will therefore move along the same intersecting planes when the brake beams are operated.

Various modifications of the present invention may be made by those skilled in the art, some of which are disclosed in separate applications filed on even date herewith, without departing from the scope of the appended claims.

What I claim as new is:

1. Brake-supporting means for a railway car truck, comprising a journal box and a brake-beam supporting-member integral with one end of the box and extending laterally from the box, the supporting-member having a guide along which the beam may travel and which terminates below the lower horizontal plane of the bottom of the box.

2. Brake-supporting means for a railway car truck, comprising a journal box and a brake-beam supporting-member integral with and supported by a lateral side of the box at one end of the box and extending laterally from said side of the box, the supporting-member independent of the truck side frame and having a guide along which the beam may travel, and the guide inclined downwardly from the adjacent side of the box and extended in a plane which passes substantially through the center of the box, the lower terminal of the guide forming a leader which is unaffected by the movement of the side frame, and said guide leader provided with manually operable stop means to prevent the downward escape of a brake-beam.

3. Brake-supporting means for a railway car truck, comprising an axle journal box, a side frame independent of the box, a brake-beam supporting-bracket integral with one side of the box, at one end of the box, and extending substantially at a right angle thereto, parallel with the side frame, and a beam-guide located on said bracket at such distance from such box side as to permit the travel of the beam when applying and releasing the brake, the height of the juncture between such side and the bracket being no greater than that of the height of the box.

4. Brake-supporting means for a railway car truck, comprising a journal box and brake-beam supporting-members thereon extending in opposite directions from the box for substantially the same distance as each other, such members integral with the opposite lateral sides of the box and having brake-beam guides along which the beams may travel.

5. Brake-supporting means for a railway car truck, comprising a journal box and brake-beam supporting-members thereon extending in opposite directions from the box, such members integral with the opposite lateral sides of the box, and each of the members having, in spacial relation to the corresponding side of the box, a brake-beam guide along which the beam may travel.

6. In a railway car truck, the combination of a wheel and axle assembly, a journal box in which the axle is mounted, brake-beam supporting-members integral with the opposite lateral sides of the box, and a brake-beam guide on each member, said guides extending away from such sides at a downward inclination.

7. In a railway car truck, the combination of a truck side frame, a wheel-and-axle assembly, a journal box in which the axle is mounted and supporting the frame for relative movements, and a brake beam supporting-member integral with a lateral side of the box and extending laterally away from the box, said member independent of the frame and being substantially the height of such lateral side at its juncture therewith, the box and such member constituting a one-piece unit, and the said member having a guide along which the beam may travel and which is inclined downwardly away from the adjacent side of the box.

CHARLES R. BUSCH.